Aug. 28, 1928.
A. G. SHAVER
1,682,429
CIRCUIT CONTROLLING MEANS
Filed April 23, 1923    2 Sheets-Sheet 1
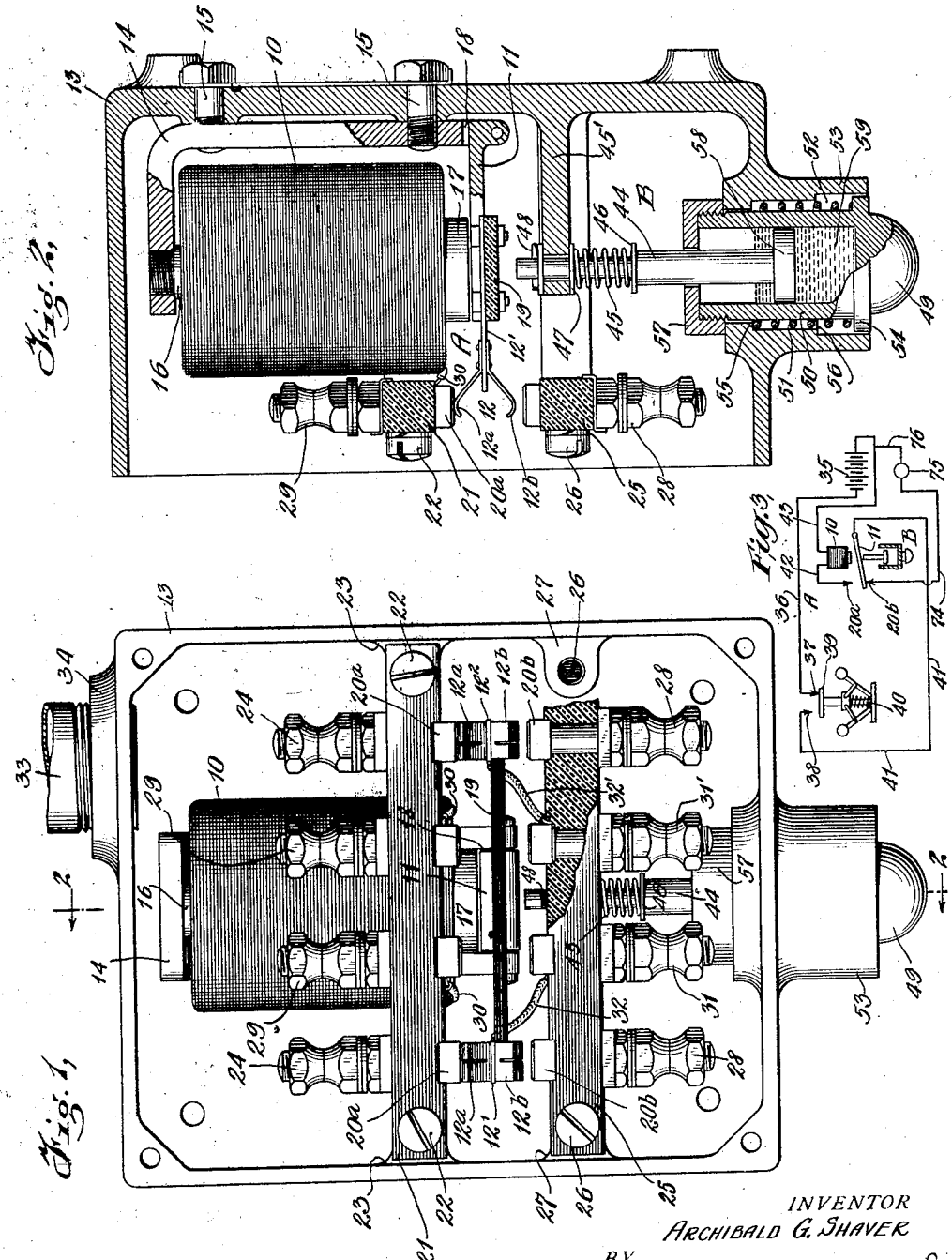
INVENTOR
ARCHIBALD G. SHAVER
BY
Meyers & Cavanagh
ATTORNEYS Aug. 28, 1928.
A. G. SHAVER
1,682,429
CIRCUIT CONTROLLING MEANS
Filed April 23, 1923  2 Sheets-Sheet 2
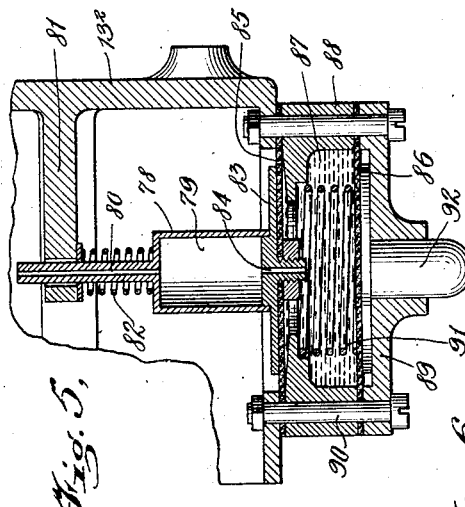
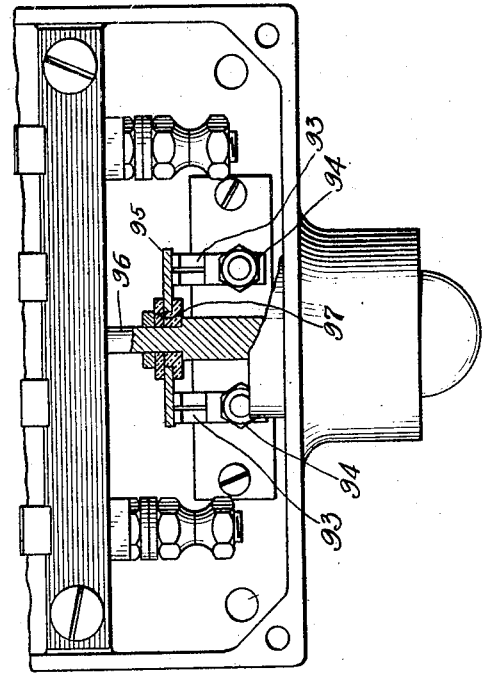
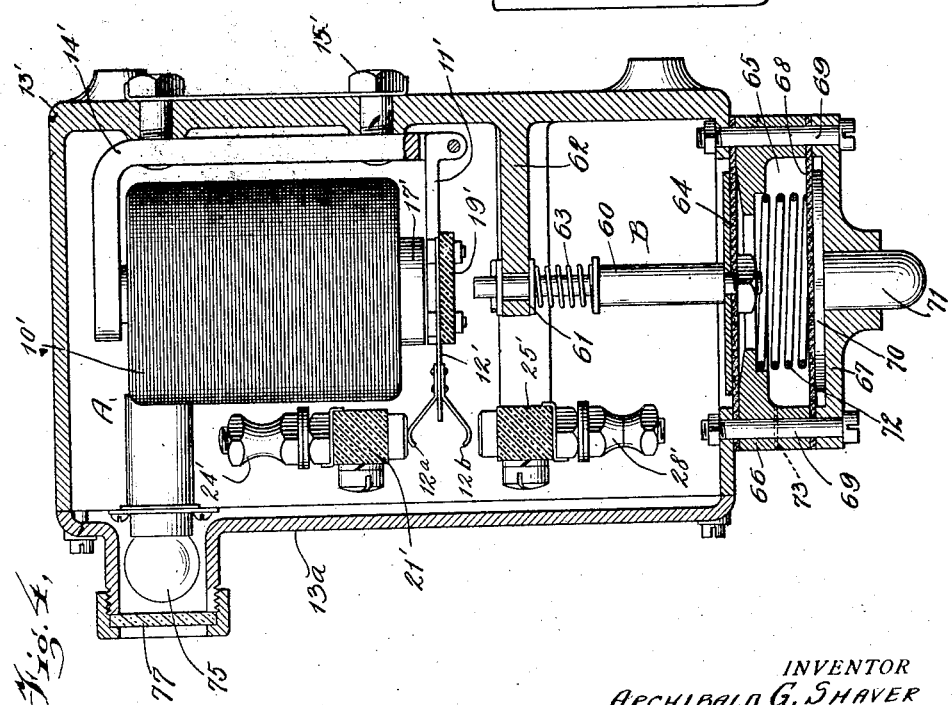
INVENTOR
ARCHIBALD G. SHAVER
BY Meyers & Cavanagh
ATTORNEYS Patented Aug. 28, 1928.

1,682,429

UNITED STATES PATENT OFFICE.

ARCHIBALD G. SHAVER, OF CHICAGO, ILLINOIS, ASSIGNOR TO THE REGAN SAFETY DEVICES COMPANY, INC., OF NEW YORK, N. Y., A CORPORATION OF NEW YORK.

CIRCUIT-CONTROLLING MEANS.

Application filed April 23, 1923. Serial No. 634,053.

This invention relates to a circuit controlling means, and more particularly to means operable to affect a circuit for a short or limited period of time; and has special reference to the provision of a circuit controlling means constructed and adapted for affecting a circuit momentarily only, and for energizing the same only under predetermined conditions.

A prime desideratum of my present invention comprehends the provision of a circuit controlling means especially adapted for controlling and operating circuits in an automatic train control system of the type disclosed for example in my copending application Serial No. 607,688 filed Dec. 18, 1922. In automatically imposing an absolute or restrictive condition of operation on moving vehicles in train control systems, it is desirable to permit the intervention of the engineman after a permissive or safe running condition of the train has been reached in order to modify the restriction imposed and to substitute a permissive control of the train, this compelling alertness and forcing obedience to signals on the part of the engineman, and permitting of expeditious movement of trains without sacrifice of safety. In providing the necessary manually operated mechanism for permitting the engineman to modify an automatically imposed restriction, it is very desirable if not indeed essential to prevent the engineman from cancelling or nullifying any operation of the automatic control mechanism as by a mis-operation or mis-use of the manually operated mechanism, and to compel him to operate the same at each time that the conditions require such an operation to be made; and the provision of a manually operated circuit control mechanism capable of accomplishing these results is a prime object of the present invention.

The principal objects of the invention may further be said to include the provision of a circuit controlling means in which a circuit may be controlled momentarily only or for a short period of time irrespective of the period of duration of the manual operation of the said circuit controlling means; the further provision of a circuit controlling means of this nature in which a stick relay is employed; the more specific provision of a circuit controlling means embodying a push button control of a circuit contact means constructed to prevent a continued controlling of the circuit by a continued application or operation of the push button; and the still further provision of a manually operated stick relay circuit controlling means in which means are provided for controlling one circuit and for controlling another circuit for indicating the operation of said first circuit.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention and in which:

Fig. 1 is a front view of the apparatus embodying the circuit controlling means with the cover or closure removed, Fig. 2 is a cross-sectional elevational view on the line 2—2, Fig. 1, Fig. 3 is a diagrammatic view of a circuit showing as an example a contemplated manner of employing the apparatus, and Figs. 4 to 6 are cross-sectional and fragmentary views of modified forms of the apparatus.

As hereinbefore stated, a prime desideratum of my present invention comprehends the provision of an apparatus manually operable for controlling a circuit for a short or limited period of time, with the controlling of the circuit made independent of the period of duration of the manual operation of the circuit controlling apparatus. Referring now more in detail to the drawings and more particularly to Figs. 1 and 2 thereof, I show one form of my invention for accomplishing this object, the invention constructionally comprising in its broader aspects a circuit controlling contact means generally designated as A and operating provisions therefor generally designated as B, the said provisions being manually actuatable for operating the contact means A and being so constructed and associated with the said contact means as to permit the latter to act independently of the former after an operation has taken place. More specifically in the preferred construction the operating provisions B are designed for producing a single impulse operation of the circuit controlling contact means A when the provisions B are operated, and to produce only a single impulse operation irrespective of the duration of operation of the provisions B so as to prevent any continued control of a circuit and to enforce an operation whenever conditions require an operation to be made.

The circuit controlling means A may broadly comprise a movable contact forming part of a circuit, and in one preferred construction comprises a stick or holding relay consisting of a relay coil 10 and a movable armature 11 therefor which carries a movable stick contact means generally designated as 12 cooperating with the fixed or stationary contact means hereinafter to be described more in detail. The relay parts may be supportingly housed by a casing 13 which may be provided with a removable closure 13$^a$ (see Fig. 4), the relay coil 10 being attached to a wall of the casing as by means of the supporting bracket 14 which may be secured to the casing wall as by means of the securing means 15, and which bracket threadedly receives a core 16 of the relay coil, the said core being provided with a pole piece 17 associated with the armature 11, the said armature being mounted for free pivotal motion on the trunnions 18 formed in the said bracket 14 for movement from an inactive to an active contact closing position, the bracket core and armature forming the magnetic circuit of the relay.

The movable contact means 12 may comprise the spaced contact arms 12′ and 12$^2$ each being preferably provided with opposed contact fingers 12$^a$ and 12$^b$, the contact arms being fixed to an insulating bar 19 attached to and carried by the armature 11. Cooperating with the contact fingers 12$^a$, 12$^a$ I provide stationary contact elements 20$^a$ 20$^a$, carried by an insulating bar 21 which is secured to the casing as by means of the securing elements 22 received in apertured ears 23 which may be formed integrally with the casing body, suitable binding posts 24, 24 being provided for electrically connecting the contact elements in a circuit. Cooperating with the contact fingers 12$^b$, 12$^b$ I prefer to provide the stationary contact elements 20$^b$, 20$^b$ which are carried by an insulating bar 25 secured to the casing as by means of the securing elements 26 threadedly received by the ears 27 which may also be formed integrally with the casing body, the binding posts 28, 28 being provided for connecting the contact elements in one or more circuits to be controlled.

For connecting the relay coil 10 in circuit, I preferably provide the contact terminals or binding posts 29, 29 which may be carried by the insulating bar 21, the terminal leads 30, 30 of the coil 10 being connected to these binding posts as is clearly shown in the figures. For connecting the movable contact arms in circuit, I prefer to provide the terminal posts 31 and 31′ which may be carried by the insulating bar 25, conductors 32 and 32′ being provided for connecting the terminal posts to the contact arms 12′ and 12$^2$ respectively. The circuit conductors connected to the binding posts may be led into the casing 13 through a conduit 33 threadedly received by the suitably tapped portion 34 of the casing.

Referring now to Fig. 3 of the drawings, I show, by way of illustrating a manner of employing my apparatus, a circuit diagram in which the controlling means A is utilized for controlling the circuit under predetermined conditions in the automatic manual operation of trains as disclosed in my aforementioned copending application. In this circuit diagram the armature contact means 11 is movable relatively to the relay coil 10 to make contact with the contact point 20$^a$ when the coil is energized, and to break contact at this point when the coil is deenergized, the coil and armature being arranged in a stick or holding circuit including a source of energy 35, conductor 36, contacts 37 and 38 closed by the bridging contact member 39 of a speed controller 40 when the speed is below a predetermined limit, conductor 41, contact armature 11, contact point 20$^a$ (when relay 10 is energized), conductor 42, relay coil 10, and conductor 43 to the source of energy 35. When this circuit arrangement is employed in my train control system, the relay coil 10 controls the movement of the train by means (not shown), the coil when energized permitting movement of the train under restricted speed conditions In the operation of the train control system, it is desired when an absolute such as a "stop" condition is imposed upon the vehicle, to permit a manually operable restrictive speed control provided the train has been reduced to a permissive or safe operating speed. It is to this end that the stick relay 10—11 is arranged in series with a speed circuit controller 40 as shown in Fig. 3 of the drawings, this so that when the armature 11 is moved from the position shown in Fig. 3 to circuit closing position as shown in Figs. 1 and 2, the circuit described will be unaffected in the event that the speed of the vehicle and the circuit speed controller 40 exceeds a predetermined limit with resulting contacts 37 and 38 open, the circuit being energized for energizing the relay coil 10 to permit the continued motion of the train in the event that the speed is below a predetermined limit as indicated by the closing of the contacts 37 and 38 by the speed controller 40.

In the operation of the above described circuit, it will therefore be seen that the circuit is desired to be controlled under predetermined conditions only, as when a continued movement of the train is desired to be effected, conditioned further upon the restricted speed of the vehicle. This circuit is automatically controlled by the speed of the train at the contacts 37 and 38, and it is desired to also control this circuit manually at the contact 20ª; and it will be seen that in order to prevent mis-use or mis-operation of this circuit manually, that it is essential to provide a manual operating means which will not interfere with the automatic control of the circuit. To accomplish these ends the operating provisions B heretofore referred to are provided, and as heretofore stated, these provisions are so constructed as to permit independent activity of the armature 11 operated thereby after an operation has taken place, this so that the automatic action of the circuit may be made independent of the manual control.

In the construction shown in Figs. 1 and 2 the provisions B may comprise a slidable stem 44 reciprocally mounted in a lug 45' which may be formed integrally with the casing 13, the stem 44 being actuatable from a normally descended or inactive position as shown in the figures to an ascended or active position for engaging the armature bar 19, a spring 45 engaging at its opposite ends the flange 46 of the stem and a bushing 47 in the lug 45' being provided for normally urging the stem to its descended position, and a pin 48 being provided for limiting the stem in its downward motion. For actuating the stem, I provide an operating push button device which may comprise a push button 49 forming part of a cylindrical receptacle 50 movable from an inactive descended position as shown in Figs. 1 and 2 to an operated ascended position against the action of a spring 51 housed in a recess 52 defined by the boss 53 forming part of the casing 13, the said spring engaging at its opposite ends a flange 54 of the push button device and a shoulder 55 formed in the casing, a second shoulder 56 being provided interiorly of the boss 53 for co-acting with the flange 54 to limit the upward movement of the cylindrical vessel. The vessel may be capped by a closure element or cap 57 threaded thereon, the said closure element cooperating with the casing for limiting the downward movement of the push button device.

To operate the armature and the actuating stem by means of the push button device while at the same time permitting of the independency of return to inactive positions of these parts to attain the desired results, the push button device is connected to the stem 44 by means preferably of a mechanism which in the form shown in Figs. 1 and 2 comprises a fluid transmission means formed by providing a piston 58 at the lower end of the stem 44 loosely fitting the interior wall of the cylindrical vessel 50, the said vessel containing a fluid 59. With this construction it will be seen that when the push button 49 is operated to an ascended position the fluid 59 acts against the piston 58 to transmit the operation to move the stem 44 to an ascended position, and to actuate the armature 11 to close the upper or front contacts 12ª, 12ª. It will be further seen that after an operation has taken place the stem 44, under the influence of gravity or of the spring 45 or both, returns to descended position independently of the return of the push button device or the armature to their inactive positions, the fluid 59 gradually seeping through the clearance provided between the piston 58 and the wall of the vessel 50, the operation being such that the armature is actuated by a mechanical impulse to assume its upper position only momentarily, the armature being free to move to its descended position in the event that the circuit is not in a condition to be energized. The condition automatically imposed upon the controlled circuit, as by the speed of the train above a predetermined limit, is therefore maintained, and is not cancelled by the operation of the push button. Moreover, with the construction provided it will be seen that the push button 49 cannot be held by the engineman or operator in its ascended position so as to thwart or negative the operation of the automatic control mechanism, a single impulse operation being provided regardless or irrespective of the duration of operation of the push button device.

Referring now to Fig. 4 of the drawings, I show a modified form of my invention in which a different form of operating means B is provided, the circuit controlling means A being preferably the same as that heretofore described, corresponding parts being here designated by printed reference characters. The operating means B may comprise a stem 60 reduced at its upper end for movement in a bushing 61 fitted to a lug 62 forming part of the casing 13', a spring 63 being provided for normally urging the stem to its descended position, the said stem being attached at its lower end to a diaphragm 64 forming the upper wall of an air chamber 65 provided by a casing 66 having a casing cover 67, a diaphragm 68 spaced from the diaphragm 64 being provided for forming the lower wall of the chamber 65, the casing 66 and casing closure 67 being all attached together and secured to the bottom wall of the casing 13' as by means of the securing elements 69. The diaphragm 68 is operated by means of a push button device which may comprise a disk 70 and a preferably integral push button 71, a compression spring 72 in the chamber 65 being provided for normally urging these parts to descended position as shown in Fig. 4. The casing 66 is also provided with a small port 73 connecting the chamber with the atmosphere, the construction being such that when the button 71 is pushed upwardly the diaphragm 68 is caused to be extended upwardly, compressing the air in the chamber 65, the compression actuating the diaphragm 64 to move the stem 60 to ascended position for moving the armature 11' and the parts carried thereby. Immediately, however, as the button 71 is moved upwardly, air in the chamber 65 escapes to the atmosphere through the port 73, the diaphragm 64 settling to its descended and normal position, this being aided by the compression spring 63; and thus even though the button 71 may be held by the operator in ascended position, the circuit controlling means is free to respond to the other and automatically imposed conditions of the circuit.

For the purpose of indicating the condition of operation of the circuit controlling means, I preferably provide a lighting circuit also controlled by the contact means, and the lower contacts or contact elements $20^b$, $20^b$ may be provided to this end. The lighting or lamp circuit may be connected as shown in Fig. 3 of the drawings to the source of energy 35, the said circuit being closed when the armature 11 assumes the descended position shown in Fig. 3, the circuit including the contact point $20^b$, a conductor 74, a tell-tale lamp 75, and a conductor 76. In the preferred construction the tell-tale lamp 75 may be conveniently carried by the casing closure or cover $13^a$, a suitable sight opening covered by the window 77 being provided therefor.

Referring now to Fig. 5 of the drawings, I show a still further modification of the manual means for operating the circuit controlling means, the operating means comprising a stem 78 formed to provide a cylindrical chamber 79 and a port 80 in the reduced portion of the stem, the said stem being guided for slidable movement by the lug 81 and being spring pressed to descended position by a spring 82, the stem being attached to a plate 83 provided with a duct 84, the said plate being attached to a diaphragm 85 spaced from the diaphragm 86, the said diaphragms forming respectively the upper and lower walls of a chamber 87 provided by the casing 88 and the casing cap 89, these parts being dependingly secured to the casing $13^2$ by means of the bolts 90, the spring 91 being supplied for normally urging the diaphragm 86 to the position shown in the figure and for normally moving a push button device 92 to its normally descended position. The chamber 87 may be filled with a fluid such as oil so that upon upward actuation of the push button device 92 the fluid will form a medium for transmitting motion of the lower diaphragm 86 to the upper diaphragm 85 to operate the stem 78, the fluid then moving through the duct 84 into the chamber 79 of the stem, displacing the air therein which moves outwardly through the port 80, the stem by this means being permitted to return to its descended position independently of the return of the push button device.

It is sometimes desirable to control a further circuit, the first movement of the push button interrupting the said circuit; and to accomplish this the construction may be modified to include the means shown in Fig. 6 of the drawings, in which the spaced contact fingers 93, 93 are provided, the binding post 94, 94 being electrically connected thereto, the contacts being normally bridged by a conducting disk or plate 95 carried by the stem 96 and insulated therefrom by means of the insulating bushing and washer elements generally designated as 97. When the push button device and stem 96 are moved upwardly, the circuit connected to the contacts 93, 93 is interrupted and is again closed when the stem assumes its normal position.

The use and operation of my circuit controlling means will in the main be apparent from the above detained description thereof. It will be further understood that while I have shown the preferred embodiments of my invention in detail, that many modifications may be made therein without departing from the spirit or principle of the invention, and that while I have shown and specifically described one manner of its use, such use was indicated for purposes of illustration and not by way of limitation, it being clear that the circuit controlling means of my invention may be used in other relations and modified in a variety of other ways,

I claim—

1. In combination, a circuit controlling means movable between active and inactive positions, a mechanism movable between active and inactive positions, movement thereof from the inactive to the active position being effective for actuating the circuit controlling means to its active position, and an operating means also movable between active and inactive positions, movement thereof from the inactive to the active position being effective for operating the said mechanism to its active position, the said mechanism being associated with both the circuit controlling means and the operating means so that the mechanism is returnable from its active to its inactive position independently of the return of either the circuit controlling means or the operating means to their inactive positions.

2. In combination, a circuit controlling contact means movable between active and inactive positions, a mechanism movable between active and inactive positions, movement thereof from the inactive to the active position being effective for actuating the contact means to its active position, and an operating means also movable between active and inactive positions, movement thereof from the inactive to the active position being effective for operating the said mechanism to its active position, the said mechanism being associated with both the contact means and the operating means so that the mechanism is returnable from its active to its inactive position independently of the return of either the contact means or the operating means to their inactive positions.

3. In combination, a circuit controlling means movable between active and inactive positions, a mechanism movable between active and inactive positions, movement thereof from the inactive to the active position being effective for actuating the circuit controlling means to its active position, and an operating push button means also movable between active and inactive positions, movement thereof from the inactive to the active position being effective for operating the said mechanism to its active position, the said mechanism being associated with both the circuit controlling means and the push button means so that the mechanism is returnable from its active to its inactive position independently of the return of either the circuit controlling means or the push button means to their inactive positions.

4. In combination, a pivotally mounted contact means movable between active and inactive positions, a mechanism reciprocably movable between active and inactive positions, movement thereof from the inactive to the active position being effective for actuating the contact means to its active position, and a manually controlled operating means also movable between active and inactive positions, movement thereof from the inactive to the active position being effective for operating the said mechanism to its active position, the said mechanism being associated with both the contact means and the operating means so that the mechanism is returnable from its active to its inactive position independently of the return of either the contact means or the operating means to their inactive positions.

5. In combination, an armature and contact means movable between active and inactive positions, a mechanism reciprocably movable between active and inactive positions, movement thereof from the inactive to the active position being effective for actuating the armature and contact means to its active position, and an operating push button means also movable between active and inactive positions, movement thereof from the inactive to the active position being effective for operating the said mechanism to its active position, the said mechanism being associated with both the armature and contact means and the operating means so that the mechanism is returnable from its active to its inactive position independently of the return of either the armature and contact means or the operating means to their inactive positions.

6. In combination, a stick or holding relay including a circuit controlling means movable between active and inactive positions to affect a circuit, and instrumentalities for operating the circuit controlling means comprising a mechanism also movable between active and inactive positions, movement thereof from the inactive to the active position being effective for moving the circuit controlling means to its active position, the said mechanism being associated with the circuit controlling means to permit the circuit controlling means to return to its inactive position independently of the return of the mechanism to its inactive position.

7. In combination, a stick or holding relay including a circuit controlling contact means movable between active and inactive positions to affect a circuit, and instrumentalities for operating the circuit controlling means comprising a manually actuatable mechanism also movable between active and inactive positions, movement thereof from the inactive to the active position being effective for moving the circuit controlling means to its active position, the said mechanism being associated with the circuit controlling means to permit the circuit controlling means to return to its inactive position independently of the return of the mechanism to its inactive position.

8. In combination, a stick or holding relay including a circuit controlling means movable between active and inactive positions to affect a circuit, and instrumentalities for operating the same comprising a manually actuatable means and mechanism operated thereby for moving the circuit controlling means to its active position, the said mechanism being associated with both said means to permit the circuit controlling means to return to its inactive position independently of the return of the manually actuatable means to an inactive position.

9. In combination, a stick or holding relay including a contact means for controlling the relay movable between active and inactive positions, a mechanism movable between active and inactive positions, movement thereof from the inactive to the active position being effective for actuating the contact means to its active position, and an operating means also movable between active and inactive positions, movement thereof from the inactive to the active position being effective for operating the said mechanism to its active position, the said mechanism being associated with both the contact means and the operating means so that the mechanism is returnable from its active to its inactive position independently of the return of either the contact means or the operating means to their inactive positions.

10. In combination, a stick or holding relay including a circuit controlling means and provisions for operating the same, the said provisions comprising a mechanism effective when actuated for producing a single impulse operation of the circuit controlling means, the mechanism being associated with said means to permit independent action of the circuit controlling means after an impulse operation.

11. In combination, a stick or holding relay including a circuit controlling means and provisions for operating the same, the said provisions comprising a manually actuatable mechanism effective when actuated, for producing a single impulse operation of the circuit controlling means, the mechanism being associated with the said means to permit independent action of the circuit controlling means after an impulse operation.

12. In combination, a relay coil, an armature therefor, mechanism operable for moving the armature in relation to the said coil, a manually actuatable means for operating said mechanism, and provisions connecting said mechanism and means to operate the mechanism when the said means is actuated and to permit the mechanism to return to its normal position independently of the return of the said means to an inactive position.

13. In combination, a relay coil, a freely movable armature therefor, mechanism movable from a normal to an operated position for imparting motion to the armature, a manually operable means movable from an inactive to an active position for imparting motion to the said mechanism, and provisions connecting the mechanism and the means constructed to permit a return of the mechanism to its normal position independently of the return of said means to its inactive position after an operation of the same.

14. In combination, a relay coil, an armature therefor, a movable stem for operating the said armature, a push button for operating the said stem, and means connecting the stem and the push button constructed to transmit an operation of the push button to the stem and to permit independent action of the stem with respect to the push button after an operation has taken place.

15. In combination, a relay coil, an armature therefor, a stem movable from a normal position to a position for engaging the armature to move the same, a push button normally occupying an inactive position and manually movable into an active position, and provisions connecting the stem and the the push button to effect a transmission of the movement of the push buttton to the stem and to permit a return of the stem to its normal position independently of the return of the push button to its inactive position.

16. In combination, a relay coil, an armature therefor, a spring controlled stem movable from a normal position to a position for operating the armature in relation to the coil, a spring controlled push button normally occupying an inactive position and manually movable into an active position, fluid means connecting the push button with the stem to produce a transmission of operation from the push button to the stem and to permit the stem to return to its normal position independently of the return of the push button to its inactive position.

17. In a device of the class described, a casing, a relay coil supported therein, an armature pivotally movable relative to the said coil, contact means fixed to said armature, a slidable stem in said casing movable from a normally descended position to an operated ascended position to move the said armature, a push button supported at the bottom of said casing and fluid means connecting the push button with the stem for transmitting motion of the push button to the stem to operate the armature.

Signed at Chicago in the county of Cook and State of Illinois this the 9th day of April, A. D. 1923.

ARCHIBALD G. SHAVER.